T. L. VALERIUS AND O. LARSEN.
ICE CREAM FREEZER.
APPLICATION FILED JULY 2, 1919.
1,354,927.
Patented Oct. 5, 1920.
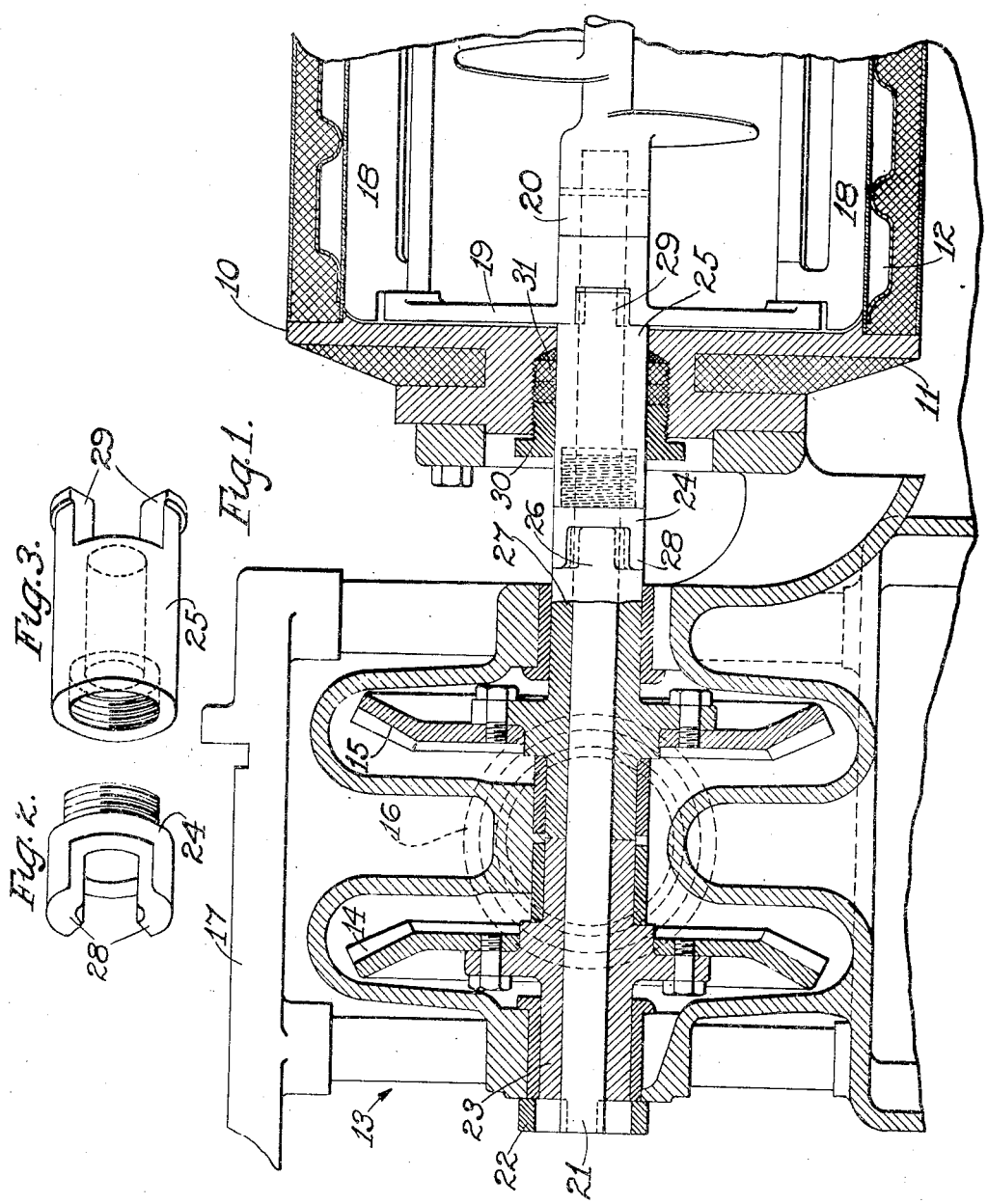
INVENTORS
T. L. Valerius
O. Larsen
By Miller, Chindahl & Parker
ATTORNEYS

UNITED STATES PATENT OFFICE.

THEODORE L. VALERIUS AND OLAF LARSEN, OF FORT ATKINSON, WISCONSIN, ASSIGNORS TO THE CREAMERY PACKAGE MFG. COMPANY, OF CHICAGO, ILLINOIS, A CORPORATION OF ILLINOIS.

ICE-CREAM FREEZER.

1,354,927.   Specification of Letters Patent.   Patented Oct. 5, 1920.

Application filed July 2, 1919. Serial No. 308,170.

*To all whom it may concern:*

Be it known that we, THEODORE L. VALERIUS and OLAF LARSEN, citizens of the United States, residing at Fort Atkinson, in the county of Jefferson, and State of Wisconsin, have invented certain new and useful Improvements in Ice-Cream Freezers, of which the following is a specification.

This invention relates to ice cream freezers and more particularly to the type of freezers illustrated in U. S. Patent No. 1,230,346 dated June 19, 1917, although it is applicable to any freezer embodying a rotating agitator. In freezers of this type it sometimes happens that the operator will shut down the freezer while there is cream in the freezing cylinder, the scraping and discharging elements of the agitator as a consequence being frozen fast to the cylinder. On starting up subsequently, these parts of the agitator may be twisted to a greater or less extent or broken, or a gear wheel may break. A good deal of trouble has been experienced because of such accidents. If the agitator is only slightly bent, so that the fact escapes the observation of the operator, the scraping blades of the agitator will not properly scrape the interior walls of the cylinder, and therefore the agitating, freezing and discharging of the cream will not be efficiently performed. If a gear wheel breaks, or if the agitator is broken or noticeably distorted, replacement of the damaged parts becomes a matter of expense and serious delay. Since it is impossible to guard against inadvertent freezing of the agitator fast to the cylinder, it is the object of this invention to localize injury at a point where repairs may be speedily and cheaply made. Further objects and advantages of the invention will become apparent as the description proceeds.

In the accompanying drawings Figure 1 is a sectional view of part of an ice cream freezer of the type illustrated in the above mentioned patent showing a breakable element and the parts associated therewith. Fig. 2 is a perspective view of the breakable element and Fig. 3 is a perspective view of the bronze element coöperating with the breakable element to form a clutch for driving the scraping and discharging elements of the agitator.

In the embodiment of the invention selected for illustration the freezing cylinder and gear jack illustrated are of common construction but they may be of any other suitable character. Briefly they comprise a cylinder 10 having insulating material 11 and brine passages 12. The gear jack 13 carries two gears 14 and 15 driven in opposite directions by a bevel gear indicated in dotted lines at 16 from any suitable source of power such as a motor (not shown) carried on the table, a portion of which is shown at 17.

The cream in the cylinder is agitated by an outer agitator comprising blades 18 mounted on the ends of the arms of a spider 19 rotatably mounted adjacent the end of the cylinder 10. A central agitator 20 is carried by a drive shaft 21 extending to the far end of the gear jack. Means are provided for driving the drive shaft 21 and spider arm 19 from the gears 14 and 15 respectively comprising a quick detachable connection 22 mounted on the rear end of the sleeve 23 carrying the gear 14 and adapted to have the shaft 21 slidably inserted to receive rotation therefrom; and a clutch member comprising a frangible element 24 and an interior clutch element 25. The frangible element 24 receives power from arcuate clutch jaws or lugs 26 on the sleeve 27 engaging the coöperating jaws 28 on the frangible element, and similar arcuate jaws 29 on the interior clutch element 25 enter apertures in the spider 19 to rotate said spider. The frangible element 24 is screw-threaded into the clutch element 25. The pitch of these threads is such that the driving force will screw the frangible element into the interior clutch element. The interior clutch element is preferably made of bronze or some other suitable non-corrosive material, as it comes in contact with the cream in the cylinder. It passes through the gland 30 having suitable packing 31 for making a tight joint.

It will be seen that the frangible element 24 is located in a clear space between the gear jack 13 and the cylinder 10 where the broken parts are uninclosed and may fall to the floor without damaging any other part of the freezer. The beaters and the shaft 21 are removable as a unit from the interior of the cylinder 10. Their removal leaves the interior clutch member 25 in the end of the cylinder. In case part 24 has been broken, part 25 can be pushed inwardly in the gland far enough to permit insertion of a spare part 24 in engagement with teeth 26. Rotation of gear 15 will then quickly screw the parts 24 and 25 together. The several parts are so proportioned in strength that the part 24 will break before the outer beater will bend and before the gear wheel 15 will break.

It will be seen that the power transmission to the outer beater contains a frangible element in an advantageous position where it may be easily replaced and where its breakage will not damage any other part of the machine. While there is shown and described in detail one embodiment of the invention it is to be clearly understood that the description is illustrative only and many modifications and improvements will naturally occur to those skilled in the art. The subjoined claims are intended to cover all such legitimate modifications and improvements.

We claim as our invention:

1. In an ice cream freezer, in combination, a freezing cylinder, a central agitator in said cylinder, an outer agitator adapted to agitate the material adjacent the periphery of said cylinder, power transmission extending into said cylinder for rotating said agitators in opposite directions, said power transmission comprising concentric drive members rotatable independently, and a relatively weak frangible element outside said cylinder forming part of the power transmission to said outer agitator.

2. In an ice cream freezer, in combination, a freezing cylinder, a gear jack spaced from the end of said cylinder and carrying axially alined gears adapted to be rotated by power in opposite directions, a central agitator located on the axial line of said cylinder, a drive shaft carried by said agitator and extending through said gears for slidable connection with the farthest gear, a peripheral agitator rotatable on the same axis as said central agitator, a sleeve connection rotatable on said drive shaft and adapted to connect said peripheral agitator with the nearest gear, and a plurality of clutch members forming part of said sleeve connection, one of said clutch members being frangible and relatively weak.

3. In an ice cream freezer, in combination, a freezing cylinder, a central agitator, a drive shaft projecting from said central agitator, a peripheral agitator comprising scrapers adapted to agitate the material adjacent the periphery of said cylinder, a spider having radially projecting arms for supporting said scrapers, said spider being journaled upon and freely rotatable with respect to said drive shaft, a sleeve journaled in the end of said cylinder, said sleeve forming a bearing for said drive shaft and having inwardly projecting clutch jaws detachably engaging the hub of said spider, a sleeve screw threaded into the outer end of said first mentioned sleeve, forming a prolongation thereof and having clutch jaws and power driven elements adapted to engage said drive shaft and said last mentioned sleeve to rotate them in opposite directions, the strength of said last mentioned sleeve being such that it will break before any other part of the transmission of which it forms a part is either bent or broken.

4. In an ice cream freezer, in combination, a freezing cylinder, a support adjacent said cylinder and slightly spaced therefrom, power driven elements on said support adapted to rotate in opposite directions, a hollow sleeve carrying the rotatable element nearest the cylinder wall and having clutch jaws, an outer clutch member in the nature of a sleeve having clutch jaws engaging those on said first mentioned sleeve, an inner clutch member in the nature of a sleeve having engagement with said outer clutch member, said inner clutch member being rotatably journaled in the end of said cylinder, and being adapted to extend inside said cylinder to engage and drive an agitator; a drive shaft detachably associated with the rotatable element farthest from the cylinder and extending through all three of said sleeves in the cylinder for operative connection to a second agitator, the strength of said outer clutch member being such that it will break before any other element of the power transmission of which it is a part is either bent or broken, and said drive shaft being readily removable by drawing it longitudinally into said cylinder whereby a spare outer clutch member can be readily inserted in place of a broken one, between said first mentioned sleeve and said inner clutch member.

5. In an ice cream freezer, in combination, an axially extending drive shaft, a plurality of axially spaced sleeves on said drive shaft having interengagement with each other for the transmission of power, means for rotating said sleeves and said drive shaft in opposite directions, one of said sleeves being frangible and relatively weak so that it will break before any other element of the power transmission of which it forms a part, is either bent or broken.

6. In a device of the class described in combination, an axially extending drive shaft and a plurality of axially spaced sleeves on said drive shaft having interengagement with each other for the transmission of power, one of said sleeves being frangible and relatively weak so that it will break before any other element of the power transmission of which it forms a part, is either bent or broken.

7. In a device of the class described, a driving element, a driven element supported a fixed distance from said driving element, and a rotary transmission element extending between said driving element and said driven element, said rotary transmission element comprising two portions having interengaging projections, one of said portions being relatively weak.

8. In a device of the class described, a driving element and a driven element normally supported a fixed distance apart, and a rotary transmission element extending between said driving element and said driven element, said transmission element comprising two portions having interengaging projections, one of said portions being relatively weak, one of said elements being adapted to be moved away from the other to permit replacement of said relatively weak element after it has been broken.

9. In a device of the class described, a plurality of torque transmitting sleeves, one of said sleeves being relatively weak and frangible.

10. In a device of the class described, a plurality of torque transmitting sleeves operatively associated, certain of said sleeves being journaled in bearings and an intermediate sleeve being relatively weak and frangible.

11. In a device of the class described, two driven elements, a drive shaft for one of said driven elements, a transmission to the other driven element comprising sleeve members encircling said drive shaft, and means for rotating said drive shaft and said sleeve members in opposite directions, said sleeve members including a relatively weak and frangible intermediate connecting sleeve.

In testimony whereof we have hereunto set our hands.

THEODORE L. VALERIUS.
OLAF LARSEN.